United States Patent [19]
Gonzalez-Lopez

[11] Patent Number: 4,988,984
[45] Date of Patent: Jan. 29, 1991

[54] IMAGE INTERPOLATOR FOR AN IMAGE DISPLAY SYSTEM

[75] Inventor: Jorge Gonzalez-Lopez, Red Hook, N.Y.

[73] Assignee: International Business Machines Corporation, Armonk, N.Y.

[21] Appl. No.: 264,922

[22] Filed: Oct. 31, 1988

[51] Int. Cl.$^5$ ............................................. G09G 1/00
[52] U.S. Cl. ...................................... 340/728; 340/731
[58] Field of Search ...................... 340/723, 728, 731; 382/47; 364/521

[56] References Cited

U.S. PATENT DOCUMENTS

| | | | |
|---|---|---|---|
| 4,090,188 | 5/1978 | Suga | 340/731 |
| 4,129,860 | 12/1978 | Yonezawa et al. | 340/731 |
| 4,610,026 | 9/1986 | Tabata et al. | 340/731 |
| 4,611,232 | 9/1986 | Searby | 340/728 |
| 4,805,116 | 2/1989 | Liang et al. | 340/728 |
| 4,855,935 | 8/1989 | Lien et al. | 340/728 |

OTHER PUBLICATIONS

Tabata et al., "High Speed Image Scaling for Integrated Document Management", ACM Conference on Office Information Systems, Toronto, Jun. 1984.

J. D. Foley & A. Van Dam; "Fundamentals of Interactive Computer Graphics, Addison-Wesley Pub. Co.", 1984, pp. 433-436.

Primary Examiner—Jeffery A. Brier
Attorney, Agent, or Firm—William A. Kinnaman, Jr.; Mark S. Walker

[57] ABSTRACT

An image interpolator implements an interpolation function providing real time, continuous zoom capability to an image dispaly system. Output image pixels are obtained by interpolating the values of the color or intensity of the 2×2 matrix of pixels surrounding the point on the input image. The preferred embodiment employs a bi-linear interpolation algorithm implemented in the form of cascaded one-dimensional interpolation circuits. Magnification control is established so that a unit increment of the zoom controller, such as a cursor on a tablet, results in a constant increase in the degree of magnification. The coefficients required for the interpolation are generated in real time avoiding the need for time consuming table look-ups.

10 Claims, 7 Drawing Sheets

| K | G | S | h | (dm) |
|---|---|---|---|---|
| 0 | 1 | 0. | 256 | ...0000... |
| 1 | 1024/1023 | 0.75 | 255 | ...1101... |
| 2 | 1024/1022 | 0.5 | 255 | ...1010... |
| 3 | 1024/1021 | 0.25 | 255 | ...0100... |
| 4 | 1024/1020 | 0. | 255 | ...0000... |
| 5 | 1024/1019 | 0.75 | 254 | ...1101... |
| 6 | 1024/1018 | 0.5 | 254 | ...1010... |
| 7 | 1024/1017 | 0.25 | 254 | ...0100... |
| 8 | 1024/1016 | 0. | 254 | ...0001... |

IMAGE INTERPOLATOR FOR AN IMAGE DISPLAY SYSTEM

BACKGROUND OF THE INVENTION

1. Field of the Invention The present invention relates to information handling systems, and more particularly to systems for processing image data for presentation on a display terminal, printer, or similar output device.

2. Description of Related Art

Image display systems have been developed to display digital images captured through optical scanning, video camera input, or via image sensors. The most basic image display systems simply reproduce the image stored in the digital image memory. More advanced systems allow for the transformation of the stored image through color enhancement, magnification (zoom), rotation, or other transformation.

The implementation of image magnification or zoom has been typically accomplished in the prior art through the use of pixel replication. In a system that uses pixel replication, an image to be magnified by a factor of 2 will be created by displaying two pixels of a given value for every one pixel of that value stored in the image storage. This form of magnification has the affect of creating what amounts to a single large pixel in place of each original pixel. At greater magnification factors this leads to considerable jaggedness in the outline of the image. Pixel replication is particularly undesirable in an image display system which allows for the display of multiple shades of gray or colors. In these systems, the replication of individual pixels creates a grainy picture of low quality.

Theoretical techniques exist for interpolating the color or intensity (gray shade) of the pixels of magnified images. The magnification process results in more than one pixel being displayed for every pixel of data stored. The addition of a pixel between a white pixel and a black pixel is better represented by a gray pixel than by the replication of either the black or white pixel. The implementation of these interpolation techniques, however, has not proved to be practical due to the considerable calculations required to interpolate the multitude of pixels in a display image. When implemented in software, interpolation results in unacceptably slow response times to magnification requests.

Tabata et al., "High Speed Image Scaling for Integrated Document Management" *ACM Conference on Office Information Systems,* Toronto, June 1984, discuss the use of high speed scaling techniques relying on table lookup and shift operations. The suggested techniques speed the process but still require the building and referencing of a table. Tabata et al. interpolate based on a subdivision that has an interval related to the numerator of the magnification factor. This causes a loss of efficiency when fine resolution on the magnification factor is required. In addition, the Tabata et al. technique is based on the period of the interpolated sample deviation to input intersample distance, which tends to have a long period further decreasing efficiency.

SUMMARY OF THE INVENTION

It is therefore an object of the present invention to provide an image display system having a magnification or zoom capability with real time interpolation of the pixels.

It is another object of the invention to provide an interpolation process that does not require the use of table lookups.

It is a further object of the invention to provide an interpolation apparatus that minimizes the number of circuits and therefore the cost required for implementation.

It is yet another object of the invention to provide an image display system that displays high quality magnified images of color and gray scale stored images.

These and other objects of the invention are implemented in the system described below in the form of the preferred embodiment.

DESCRIPTION OF THE PREFERRED EMBODIMENT

Figure 1:
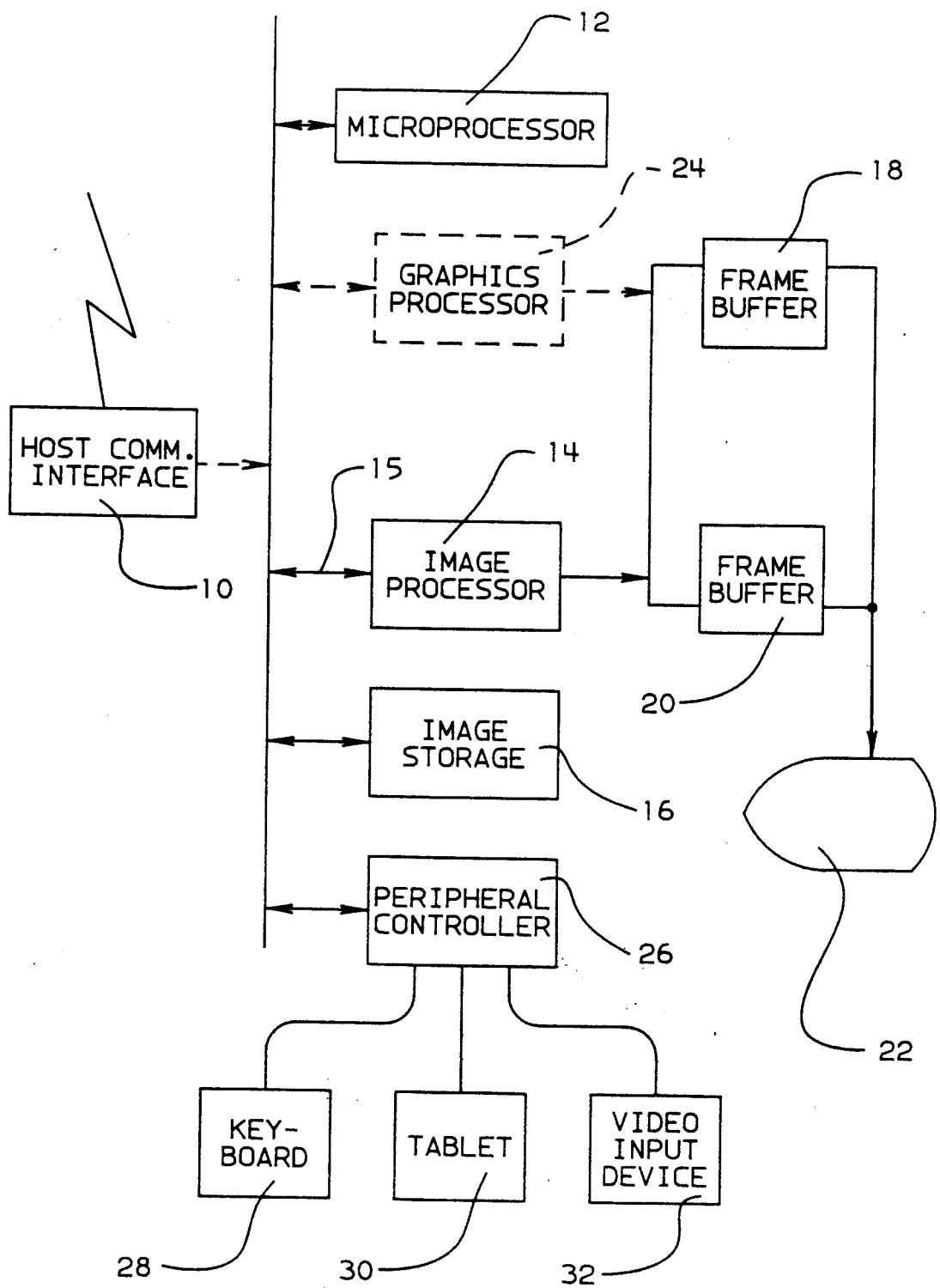
FIG. 1 is a block diagram of an image display system incorporating an image processor according to the present invention.

An image interpolator according to the present invention operates in an image display system as shown in FIG. 1. The image display device is typically connected to a host computer system through a host communications interface 10. A microprocessor 12 is provided to control terminal functions including host communications, data acquisition, managing an image storage 16, and providing parameters to an image processor 14. Image processor 14 is responsible for accessing image data stored in image storage 16 and placing it in frame buffers 18 and 20 for display upon the monitor 22. The image display system typically uses a dual frame buffer system so that one frame buffer, for example, frame buffer 18, is used for display generation while the second frame buffer, e.g. frame buffer 20, receives the image data from the image processor 14. The assignment of the frame buffers is reversed when the second frame buffer has been filled. Image processor 14 performs image manipulation functions such as translation, rotation, color transformation, and magnification or zoom as described for the present invention. Image data is stored in image store 16, typically a random access memory. Optionally, a graphics processor 24 may be included in the image display system to generate graphic objects based on graphics orders. Peripheral controller 26 is provided to control input and output devices such as keyboard 28, a graphics tablet 30, or a video input device 32.

Image interpolation is a function of image processor 14. Processing of the image without translation, magnification, or rotation involves essentially the mapping of each picture element, or pixel in image store 16 to a pixel in frame buffer 18 or 20. Magnification or zoom results in the addition of pixels in the frame buffer so that the resulting frame buffer image is larger than the image contained in image store 16 by a given magnification factor. For example, an image stored in image store 16 that has four pixels by four pixels, when magnified by a factor of 2, would result in an image of 8 pixels by 8 pixels in the frame buffer. Thus, the image processor must create an image with more pixels than exist in the original input.

The problem becomes one of determining the intensity or color of the newly inserted pixels. This is accomplished by mapping the additional output pixels back to the input pixels, and interpolating the intensity or color of the added pixels from the color or intensity values of the existing input pixels. For example, in FIG. 2 the original image was represented by pixels P(1,1), P(1,2), ..., P(3,4). The magnified image creates additional pixels located as shown by U(1,1), U(1,2), ... U(3,4). The value of the intensity of pixel U(1,1) is a function of the intensities of pixels P(1,1), P(1,2), P(2,1), and P(2,2). The creation of a real time magnification or zoom requires that the interpolation of intensity be performed as rapidly as possible with hardware of a reasonable cost.

Interpolation can be extended to color images with the data from several components (e.g. red, green and blue, or hue, intensity, saturation) of the input image being processed in parallel by multiple interpolators and the results for each pixel combined and stored in a single word of the frame buffer. The interpolators could use the same set of parameters and share the same control logic and some of the input and output logic.

The specification of the magnification factor is accomplished by the image display terminal operator through the use of tablet 30 or other similar device. The display terminal operator will first indicate that magnification or zoom is required. Then by movement of the tablet cursor or similar action the user will specify the magnification factor to be applied. In the preferred embodiment, the system is configured so that a movement of the tablet cursor a certain distance results in a given magnification regardless of the present magnification value. Additional movement will result in additional magnification by linearly increasing factors.

A discussion of the mathematical basis of the present invention will now be provided. The preferred embodiment of the present invention employs a known bi-linear interpolation algorithm. Although this description deals mainly with this particular algorithm, the concept may be extended to many other interpolation algorithms. The present invention provides a continuous zoom capability, which means that the magnification factor can be any number in a permitted range and need not be limited to integers.

The preferred embodiment of the present invention is based on two fundamental approximations in the interpolation process. First, the location in an x,y plane of an interpolated point is approximated to the nearest point in a predefined, two dimensional grid overlaying the input image. This approximation implies an error in the intensity value of the interpolated point. This error can be made as small as required by defining a sufficiently dense grid. Second, the magnification factor, G, is restricted to be in the form of:

$$G = \frac{A}{B} ; \begin{array}{l} A \geq B \text{ and} \\ G \leq G_{max} \end{array}$$

and in which A and B are positive integers, A is fixed in the specific implementation, and $G_{max}$ defines the maximum magnification allowed by the implementation. A virtually continuous zoom can be obtained by defining A large enough to allow a sufficiently large set of possible G values.

Figure 2:
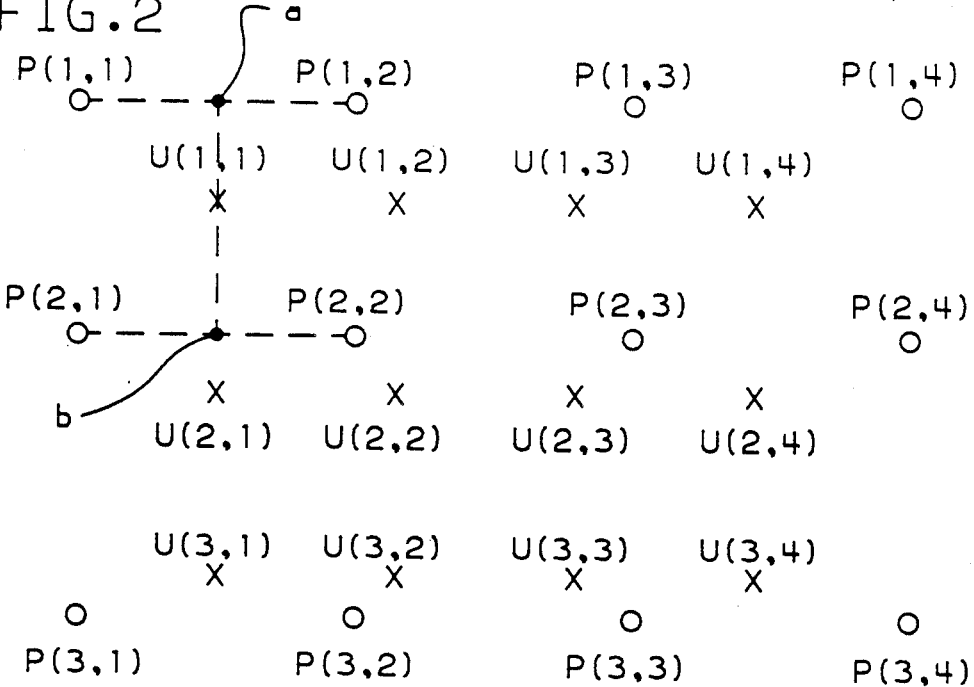
FIG. 2 is a diagram illustrating the relationship between the input image and interpolated pixels in a system according to the present invention.

The preferred embodiment of the present invention uses a bi-linear interpolation algorithm. An output point, such as pixel U(1,1) of FIG. 2, is computed as a linear combination of the four nearest points. The bi-linear interpolation function is separable into x and y components. Thus, the algorithm can be implemented as a cascade of two one-dimensional interpolations. Referring to FIG. 2, the value of the intensity at point "a" can be determined based on the intensities at P(1,1) and P(1,2). Then the intensity at point "b" can be determined as a function of the intensities at P(2,1) and P(2,2). Finally, the value for pixel U(1,1) can be determined as an interpolation in the y direction based upon the values at points a and b.

Figure 3:
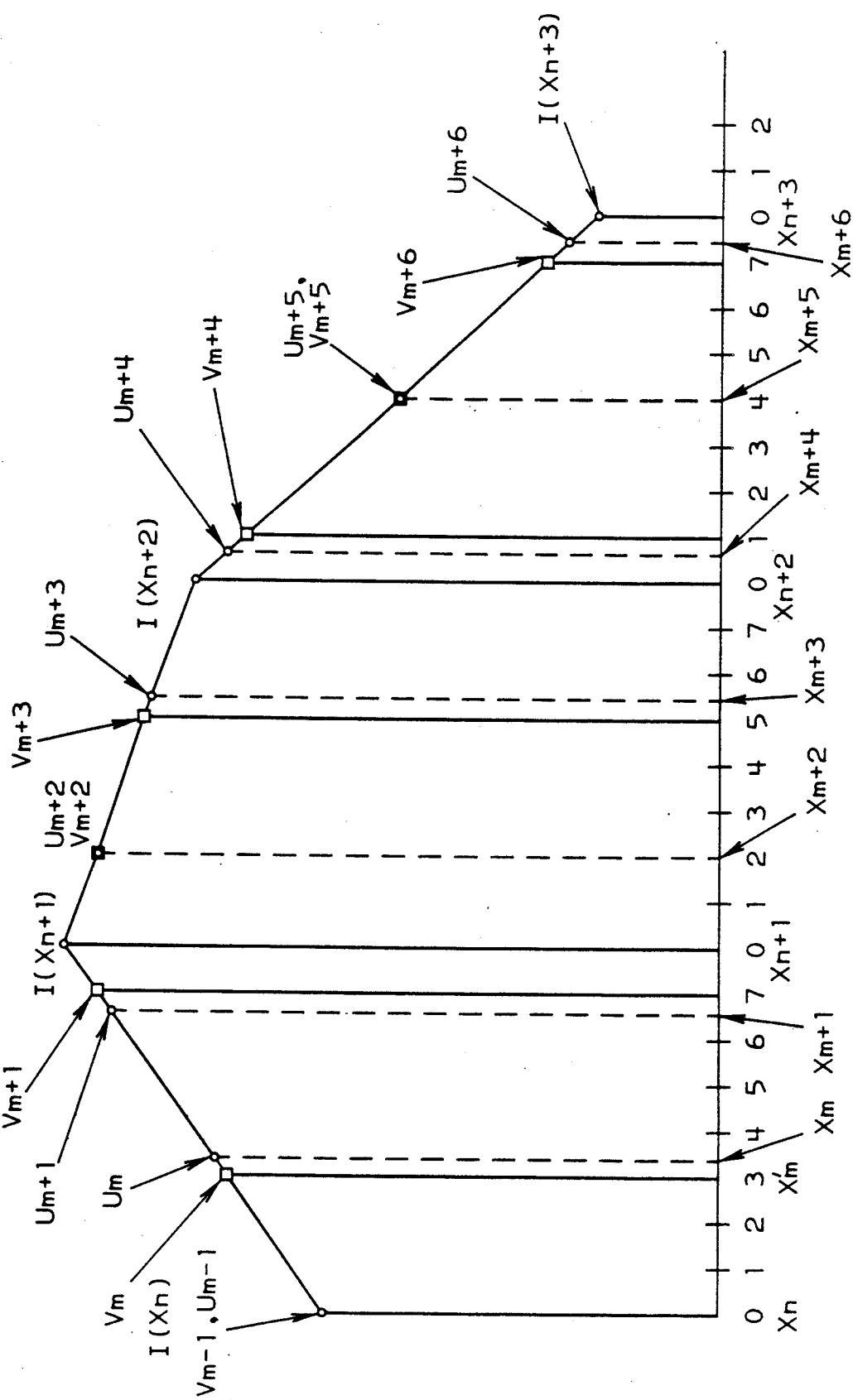
FIG. 3 is a graph illustrating interpolation in one dimension according to the present invention.

The interpolation process will be explained with reference to FIG. 3 which represents one-dimensional interpolation with a magnification factor G=2.4. FIG. 3 illustrates the interpolation between four input points at $X_n$ through $X_{n+3}$. The corresponding intensities are $I(x_n)$ through $I(x_{n+3})$. A magnification factor of 2.4 results in the creation of eight pixels in the frame buffer output image based on the four input pixels.

The problem is then to find the intensity values of the points $U_m, U_{m+1}, \ldots$ such that the ratio of the intersample distance between the output points to the intersample distance between the input points is constant and equal to the magnification factor. For bi-linear interpolation, it can be shown that any interpolated sample, for example, $U_m$, lies on the straight line connecting $I(x_n)$ and $I(x_{n+1})$. Or in other words that:

$$U_m = U(X_m) = (1 - B_m)I(X_n) + B_m I(X_{n+1}) \quad (1)$$
where $X_n \leq X_m \leq X_{n+1}$
and, $$B_m = \frac{X_m - X_n}{X_{n+1} - X_n} = \frac{X_m - X_n}{T_s} \quad (2)$$

with $T_s$ being the input inter-sample distance. $B_m$ is the ratio of the distance between the interpolated point and the previous input point to the intersample distance. e.g. $B_m = 0.25$ indicates that $X_m$ is 25% of the distance between $X_n$ and $X_{n+1}$.

An approximation of the interpolated value is developed by first arbitrarily specifying a uniform subdivision of the input inter-sample distance $X_{n+1} - X_n$ into T parts where T is an integer. Instead of computing the interpolated value $U_m$ at $X_m$, which is difficult due to the requirement for higher arithmetic precision, the value of $U(X'_m)$ will be calculated with $X'_m$ being the point on the subdivision grid closest to $X_m$. Then let $V_m = U(X'_m)$ which is the interpolated value at the approximated location $X'_m$.

As the original input sequence is bounded (assume it ranges between 0 and 255 as in usual images), the maximum error in taking $V_m$ for $U_m$ is also bounded. The maximum error is a function of how dense the grid is defined. For $T=256$, the maximum error is equal or less than one half the quantization step of the input sample.

The previous equation (1) can be rewritten as $$V_m = (1-A_m) I(X_n) + A_m I(X_{n+1}) \tag{3}$$

where $A_m$ is an approximation of $B_m$ expressed as:

$$A_m = \frac{1}{T} \text{ROUND}(T*B_m) \tag{4}$$

The function ROUND(n) gives the closest integer to (n).

This equation implies that the value of $B_m$ is known, however the preferred embodiment of the invention uses a recursion formula to determine the value of $A_m$ as follows:

$$A_m = \frac{1}{T} \text{MOD}(T*A_{m-1} + h + d_m, T) \tag{5}$$

where
$$h = \text{FLOOR}(T/G) \tag{5a}$$

MOD(a,b) is a modulo b, and FLOOR(n) the integral part of (n).

The correction term $d_m$ is made equal to 0 or 1, such that:

$$A_m = \frac{1}{T} \text{ROUND}(T*B_m) \tag{5b}$$

This formulation means that the value of $A_m$ is obtained from the value of the previous coefficient $A_{m-1}$ by adding an integer h. This value is occasionally corrected by adding one ($d_m$) so that the selected grid point is the closest to the theoretical position. The problem is reduced to finding the appropriate sequence of values for $d_m$. The example of FIG. 3 corresponds to a situation where $T=8$ and $G=2.4$ (which implies $T/G=3.333...$ and $h=3$). Note that the abscissas of the samples $V_m$, $V_{m+2}$, $V_{m+3}$, $V_{m+5}$ and $V_{m+6}$ are obtained by adding h to the corresponding abscissa of the previous sample. However the abscissas of $V_{m+1}$ and $V_{m+4}$ are obtained adding $h+1$.

Figure 4:
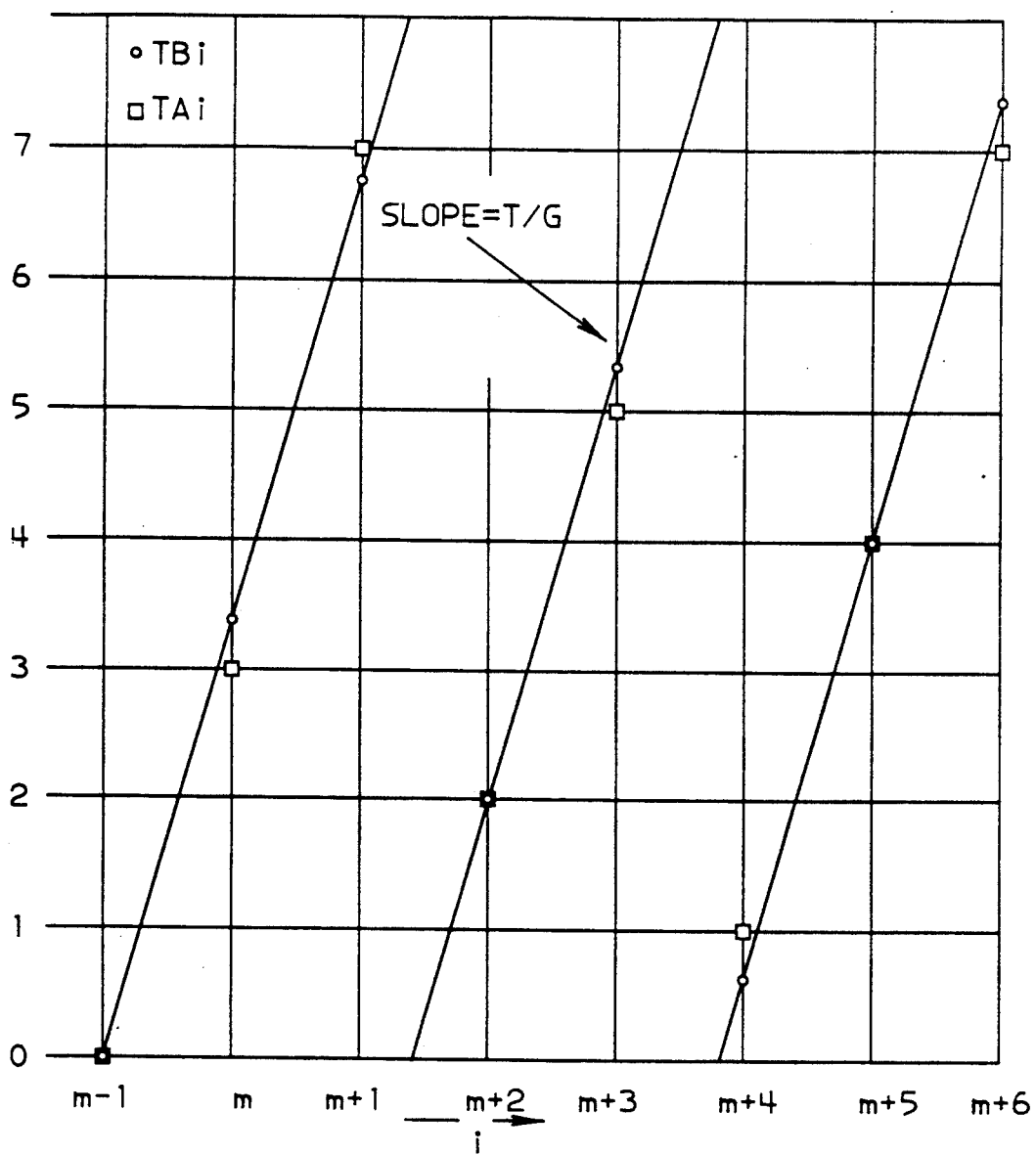
FIG. 4 is a graph depicting the relationship between the values of $TB_i$ and the approximation $TA_i$ employed in the present invention.

FIG. 4 graphically illustrates the relationship between the values $T*A_i$ and $T*B_i$ where $i=m-1$, m, $m+1, \ldots$ . $T*B_i$ defines the location of a point with respect to the subdivision grid. In the example above, $T*B_m = 3.333$ indicating $X_m$ is between the third and fourth points of the grid. $T*A_m$ approximates $T*B_m$ to the nearest subgrid point. I.e. in the example $T*A_m = 3$. The values of $T*B_i$ lie on a straight line with a slope of $T/G$. The values of $T*A_i$ are shown as the approximations of $T*B_i$ lying on the subgrid.

Figure 5:
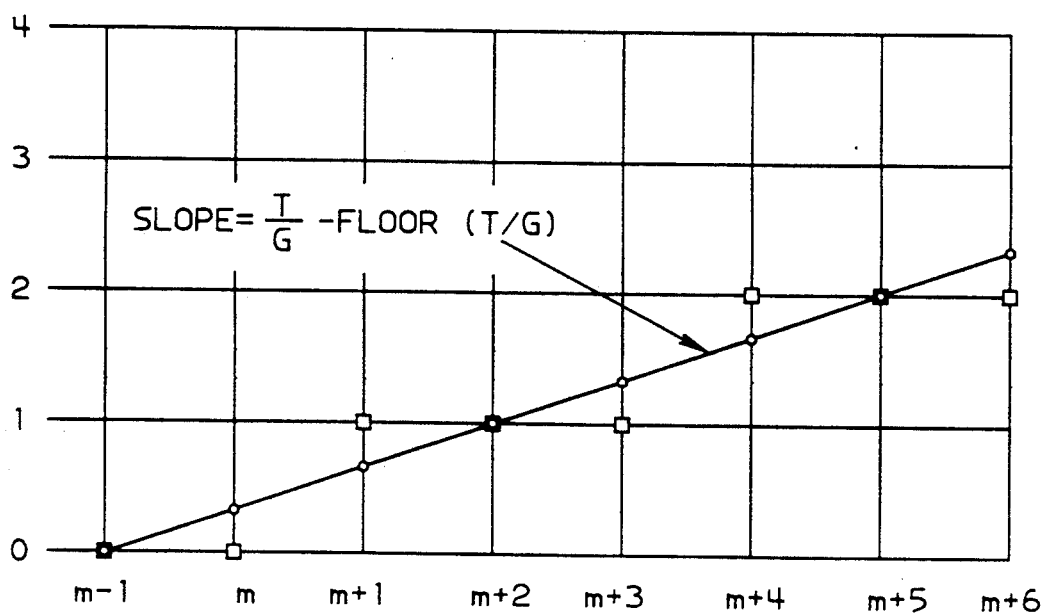
FIG. 5 is a graph depicting the values of $TB_i$ and $TA_i$ after subtracting the constant slope.

FIG. 5 shows a line obtained after subtracting a line with a slope equal to h (in this example, 3) from the line of FIG. 4. The errors between the values of $T*B_i$ and $T*A_i$ can be expressed in units of the subdivision grid. From this figure it is apparent that the computation of the $A_m$ values can be done using an algorithm similar to Bresenham's algorithm used for vector generation in graphics systems. A description of the Bresenham algorithm is presented, for example, in *Fundamentals of Interactive Computer Graphics*, by J. D. Foley and A. VanDam, published by Addison-Wesley, 1984, pp. 433-436. This type of algorithm computes the points on a discrete grid as close approximations to a given straight line. The slope of the line must be a rational number less than 1.0.

As stated above, it is desirable to be able to have a linear increase in magnification in response to a specific amount of movement of the cursor on the tablet or similar input device. This makes it desirable to specify the magnification factor, G, as a function of an index L such that as a certain image is being displayed with a magnification factor $G(L)$ and L is incremented, the resulting new image increases by a factor that is constant and independent of the value of L. In other words:

$$G(L+1)/G(L) = 0 \tag{6}$$

with 0 being a constant greater than one and representing the magnification increment associated with a unit increase in the index L. Equivalently:

$$G = Q**L; 0 < L < Lmax \tag{7}$$

The preferred embodiment, however, defines the magnification factor in a slightly different way to facilitate the implementation in hardware. This expression can be converted into the form of equation (7) as will be discussed later. The magnification factor expression as used in the preferred embodiment is:

$$G = \frac{N/2}{N/2 - K/w} \tag{8}$$

in which N is the screen size in the dimension being considered, x or y, K as an index and w is a parameter fixed in the implementation.

The meaning of the term $K/w$ is related to the effect of magnification on the display. If $K/w$ equals 0, then $G=1$, indicating that there is no magnification and that the stored image will be presented exactly as it has been stored. Thus, for a screen with 1024 columns ($N=1024$) the resulting display will also occupy 1024 columns. If $K/w=1$, then $G=512/511$, i.e. the image has been magnified so that 1022 of the input columns occupy 1024 screen columns on the output. If the center of the image is assumed to remain in the same position, then one column at the left and one column at the right of the image have been discarded through this magnification. For $K/w=2$, two columns at each side of the input image are discarded. Thus, the parameter $1/w$ specifies the fraction of the column that is discarded on each side of the input image when K is incremented by 1, i.e. K must be incremented by w to discard one column of the column at each side. The value selected for w determines the granularity of the magnification. A value of w in the order of magnitude of $G_{max}$ provides smooth changes in magnification as discussed below.

The magnification equation can be rewritten as $$G = \frac{D/2}{D/2 - K} \tag{9}$$

with

-continued $$D = w*N$$

Since w and N are both fixed in this implementation, D will be a constant in that implementation. With this new formulation, the value of h, i.e. the integer slope (from equation 5a), can be expressed as:

$$h = \text{FLOOR}\left(T - \frac{2KT}{D}\right) = T - \text{CEIL}(2KT/D) \quad (10)$$

where CEIL(x) is a function that returns the closest integer greater than or equal to the value of x. The slope of the line, FIG. 5, can therefore be expressed as:

$$\begin{aligned} S &= \text{CEIL}(2KT/D) - 2KT/D \\ &= \frac{(D/2T)\text{CEIL}(2KT/D) - K}{D/2T} \end{aligned} \quad (11)$$

If D/2T is an integer, the above expression is a rational number and, therefore, it is suitable for a Bresenham's algorithm. Furthermore, if T and D are selected such that $$D/2T = 2**r \quad (12)$$

r being an integer, then $$S = \frac{(2r)\text{CEIL}(K/2r) - K}{2**r} \quad (13)$$

and the implementation is simplified.

As an example consider the case N=1024, T=256, w=2 which results in D=2048, r=2 and $$S = \frac{4\,\text{CEIL}(K/4) - K}{4} \quad (14)$$

Figures 6, 7:
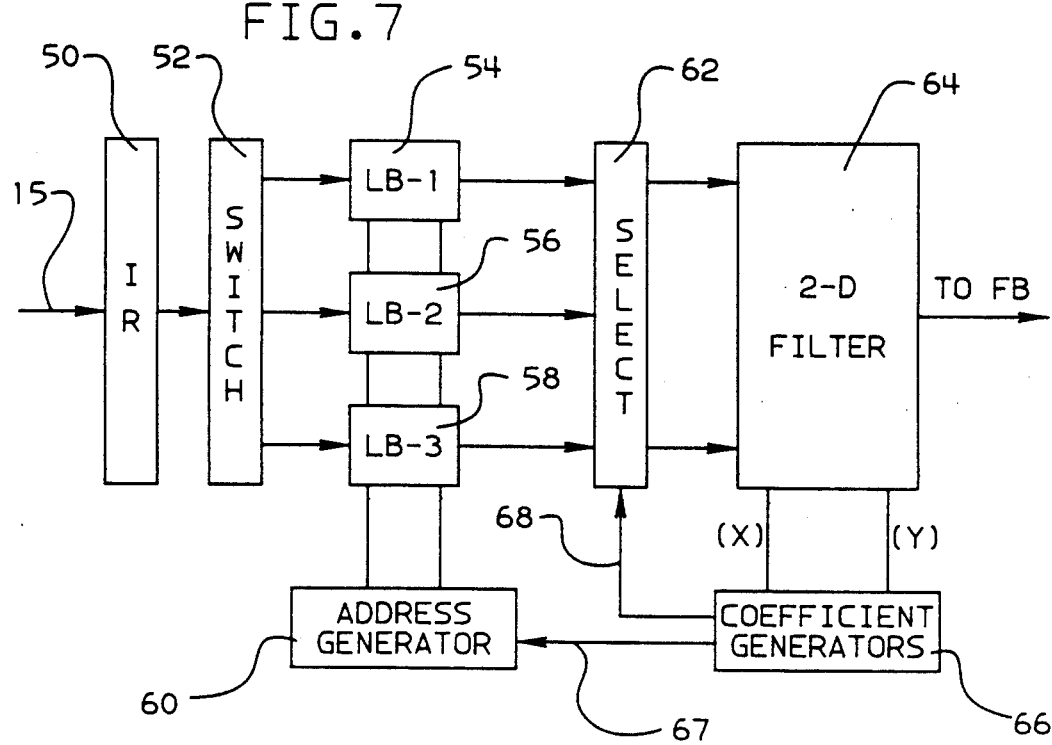
FIG. 6 is a table of factors derived according to the present invention.
FIG. 7 is a block diagram of the image interpolator according to the present invention.

The table of FIG. 6 shows the values of G, S, h, and the periodic pattern of $d_m$ as a function of K for this particular example. Note that the pattern of $d_m$ has a period with maximum length equal to 2**r.

The initial value for d, i.e. d0, is a function of how close the actual coefficient A0 is to the theoretical coefficient B0. Its value will be given later.

As stated above, this specification of magnification factor G, can be converted into a form that is a function of an index L such that a unit increase in L results in a constant increase in the magnification factor. The conversion between the two forms is accomplished as follows.

The function G(K) increments most rapidly for $G = G_{max}$. For this value of G, the corresponding value of K is $$K_{max} = \frac{D}{2}\left(1 - \frac{1}{G_{max}}\right) \quad (15)$$

Let $$G' = G(K_{max} - 1) = \frac{D/2}{D/2 - (K_{max} - 1)} \quad (16)$$

be the allowed value of G that is closest to $G_{max}$. Defining Q as:

$$Q = \frac{G_{max}}{G'} \quad (17)$$

then $$Q = 1 + \frac{G_{max}}{D/2} \quad (18)$$

and $$K = \frac{D}{2}(1 - Q^{**} - L) \quad (19)$$

which gives K as a function of L. (The obtained value of K should be rounded because K must be an integer).

The range of L corresponding to the range 0-$K_{max}$ of K is 0 to $L_{max}$ with:

$$L_{max} = \frac{\text{LOG}(G_{max})}{\text{LOG}(Q)} \quad (20)$$

L can be entered by the terminal operator using a tablet for example. The computation of K as a function of L must be done once per frame or about 10 times per second. The equation can be computed by the system control processor, directly or via a look-up table. It is still possible to use a look-up table for the conversion of certain values of K only and to compute the values in between by linear interpolation (piece-wise linear approximation).

For N=1024, w=32, and $G_{max}$=32, $L_{max}$ is 1777 (1776.189) and Q=1.001953. This value of Q guarantees that, in the range from G=1 to G=32, going from L to L+1 results in one column being discarded at both sides of the previous image. This granularity is assured by the value w=32 and causes the magnified image to change smoothly as the magnification is changed. Smaller values of w would result in a more coarse implementation. A change in magnification would cause a noticeable jump in the output image when several columns are dropped. A one-dimensional magnification in the X axis has been discussed but the same techniques can be applied with respect to the Y axis.

The implementation of an interpolator according to the preferred embodiment of the present invention is illustrated in FIG. 7. The interpolator block diagram in FIG. 7 is a component of the image processor 14 shown in FIG. 1. The interpolator receives data from image store 16 on input line 15. Data from image store 16 is latched in an input register 50 and is then stored in line buffers 1 through 3 under the control of switch 52. The image processor accesses data from image store 16 on a row-by-row or line-by-line basis. The pixels from the image store are read into input register 50, e.g. 4 pixels at a time. Switch 52 causes the data to be transferred into line buffer 1 54 into consecutive locations. Line 2 data is transferred to line buffer 2 56 and line 3 to line buffer 3 58. The 2D filter 64 uses the data of the first two lines of the input image to compute as many lines of the output image as required by the magnification factor G in effect. The result is transferred to one of the two frame buffers as it is being computed. The fourth line of input received from the input store 16 is transferred to line buffer 1 54 after the computation using the first two lines of data has been completed. During this transfer, the contents of line buffer 2 56 and line buffer 3 58 are used by the 2D filter 64 to generate additional lines of the output image. The process is repeated in the same fashion until the entire output image is computed and transferred to the frame buffer.

The line buffer select is controlled by line 68 output from the coefficient generator. Address generator 60 raises the data from the input image stored in the line buffers to be transferred to the interpolator. The address is incremented in response to a signal on line 67.

Figure 8:
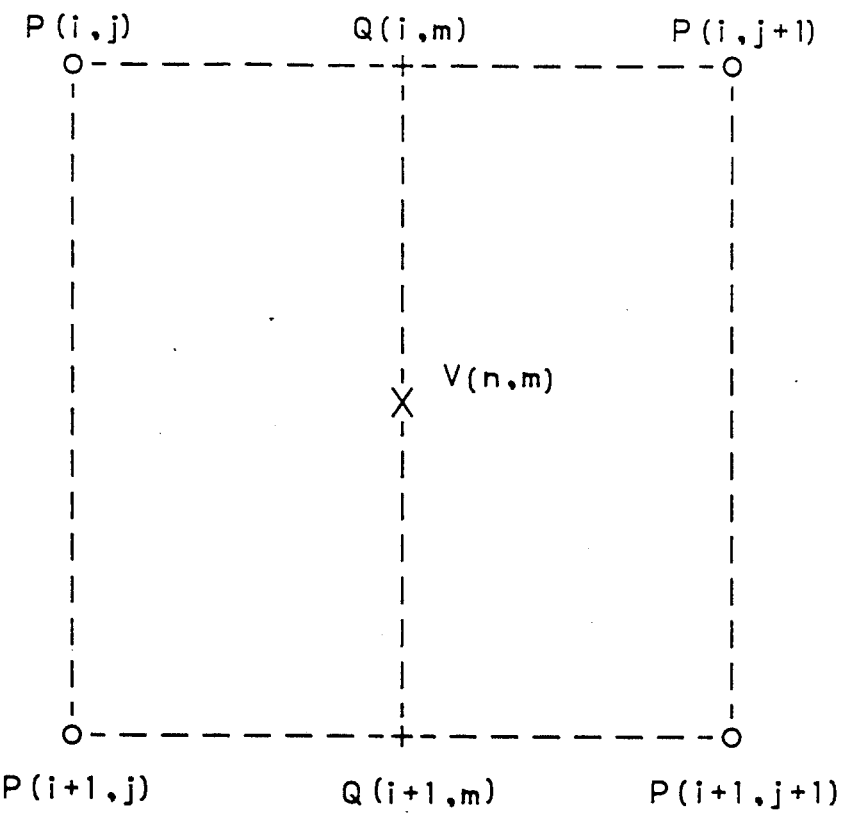
FIG. 8 is a diagram depicting the relationship between input pixels and interpolated pixels in one and two dimensions.
Figure 9:
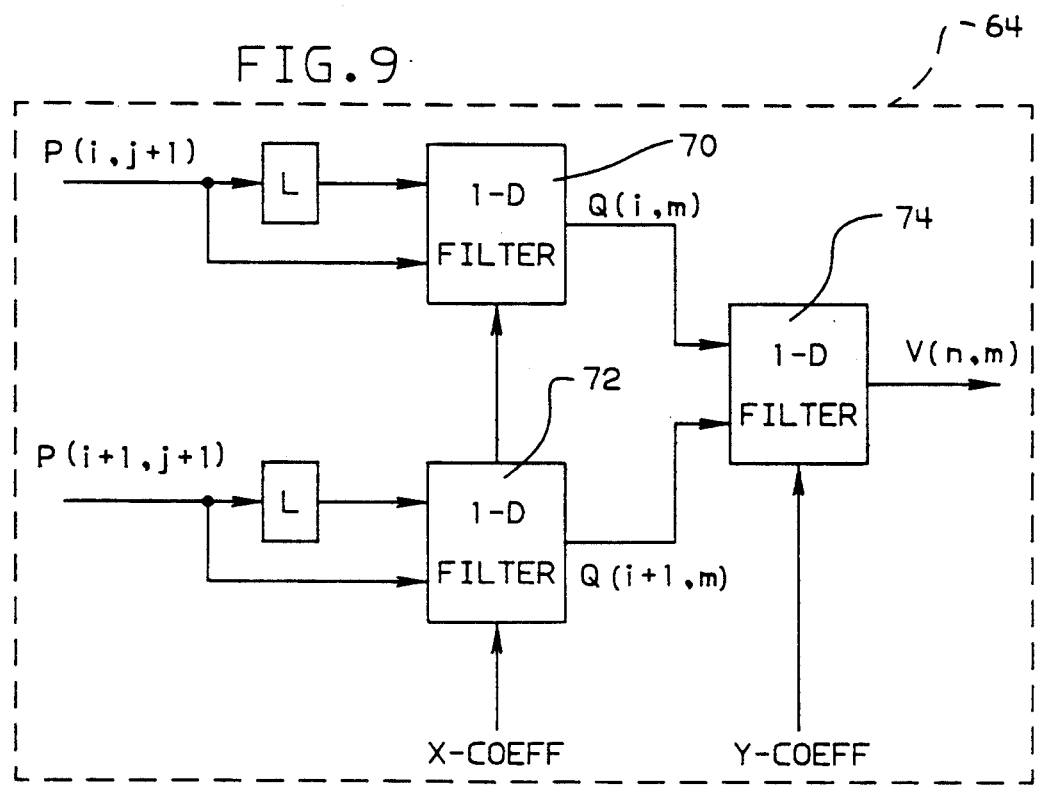
FIG. 9 is a block diagram of a two dimensional filter according to the present invention.

As discussed above, the two-dimensional filter required to interpolate the data can be implemented in two one-dimensional steps. FIG. 8 illustrates how pixel V(n,m) is computed as a function of pixels P(i,j), P(i,j+1), P(i+1,j), and P(i+1,j+1). In a first step pixel Q(i,m) is computed as a function of P(i,j) and P(i,j+1). Pixel Q(i+1,m) is also computed as function of P(i+1,j) and P(i+1,j+1). In a second step pixel V(n,m) is computed from the computed values of Q(i,m) and Q(i+1,m). The 2D filter 64 is shown in greater detail in FIG. 9. Two 1D filters 70 and 72 compute the samples Q(i,m) and Q(i+1,m). A third 1D filter 74 computes the output sample V(n,m).

In an alternate embodiment, 1D filter 70 can be eliminated since the sample for Q(i,m) has been previously computed by the 1D filter 72 when processing the previous input line and, therefore could be stored in a buffer containing the complete output line.

Figure 10:
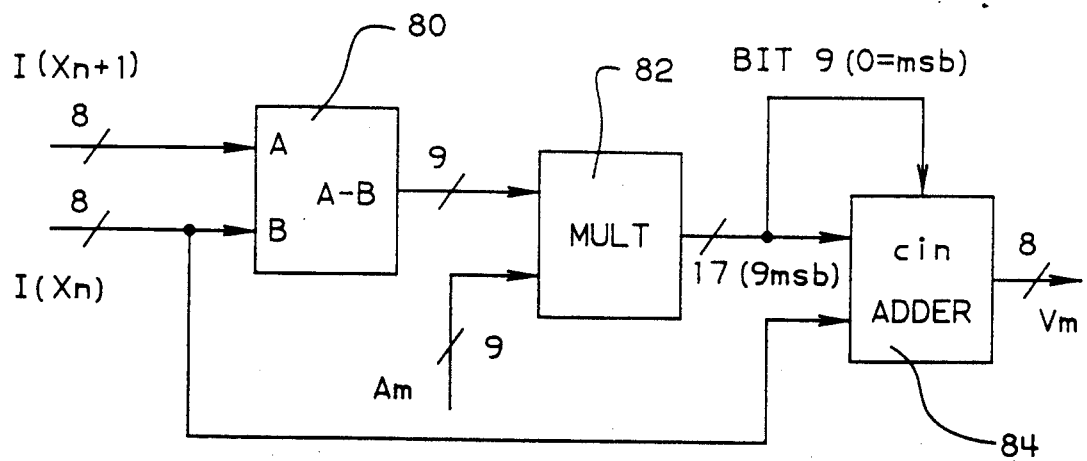
FIG. 10 is a block diagram of a one dimensional filter according to the present invention.

FIG. 10 is a block diagram that illustrates the implementation of 1D filters 70, 72 and 74 in the preferred embodiment. This block diagram implements the equation for $V_m$ such that:

$$V_m = (1 - A_m)I(X_n) + A_m I(X_n+1) \quad (21)$$

which can be written as:

$$V_m = I(X_n) + A_m [I(X_n+1) - I(X_n)] \quad (22)$$

which requires a single multiplication per output sample.

Assuming that the input sequence is in the range 0 to 255, that T=256, and Am is represented in 9 bits (8 bits for the coefficient, one additional bit to allow T*Am=256), the range of possible products is in the closed interval (−65280,65280) which requires 17 bits to be represented. The output adder takes the 9 most significant bits of the product and the input sample (with an additional positive sign bit) to compute the output sample. The 10th most significant bit of the product enters the carry-in input to round the result. The result is contained in the 8 least significant bits of the adder output.

The error at the output is a contribution of two terms:

1. Contribution term from rounding the result. In this example this is equal or less than 0.5 of the quantization level.

2. Contribution term from coefficient approximation. This term is the product of the error in the coefficient times the difference between the values of the two input samples The worst case for a given approximation error in Am occurs when one of the samples is zero and the other is 255. This term is equal or less than 0.5 quantization level.

The total maximum error in each dimension is one quantization level. The total error in both dimensions is equal or less than two quantization levels for the example being considered.

2D filters 64 and hence the 1D filters 70, 72 and 74 require the input of x and y coefficients to perform the interpolation. The present invention provides a means of generating these coefficients in real time without the requirement for a look-up table. Coefficient generator 66 (FIG. 7) is illustrated in greater detail in FIG. 11.

The value of the coefficient Am can be obtained from the position of the computed sample in the subdivision grid ($X'_m$). For the bi-linear algorithm, the value of the coefficient is:

$$A_m = \frac{X'_m - X_n}{X_{n+1} - X_n} = \frac{(X'_m - X_n)}{T_s} \quad (23)$$

with $T_s$ the input inter-sample distance. The number $T^*A_m$ gives the position of the sample with respect to $X_n$ in terms of units of the subdivision grid. Note that knowing $T^*A_m$ allows computation of the coefficient when other interpolating techniques are used provided the impulse response of the corresponding filter is known. For example, if a magnification by pixel replication is desired, the required coefficient can be computed as:

$$A'_m = SIGN(0.5 - A_m) \quad (24)$$

SIGN(a) is zero if A is negative, and one if A is positive or zero.

The computation of subsequent $TA_m$ requires the computation of $d_m$ which can be obtained with a Bresenham's algorithm. Assuming that $D/2T = 2^{**}r$, i.e. a power of two, the parameters of the Bresenham's algorithm are:

$$DX = 2^{**}r \quad (25)$$
$$DY = 2^{}r \, CEIL(K/2^{}r) - K$$
$$D0 = 2^{**}r (2E_0 - 1) + 2DY \quad (25)$$

DY/DX corresponds to the slope of the line of FIG. 5, D0 is the initial accumulated error term of the Bresenham's algorithm, and $E_0$ is the error in the position of the first sample in terms of units of the subdivision grid, i.e.

$$E_0 = T \frac{X_m - X'_m}{X_{n+1} - X_n} \, ; (m = 0) \quad (26)$$
$$-0.5 \leq E_0 < 0.5$$

The expression for D0 has been obtained from the equation that relates the error term, $D_i$, and the approximation error, $E_i$ in the Bresenham's algorithm:

$$D_i = DX(2E_i - 1) + 2DY \quad (27)$$

Figure 11:
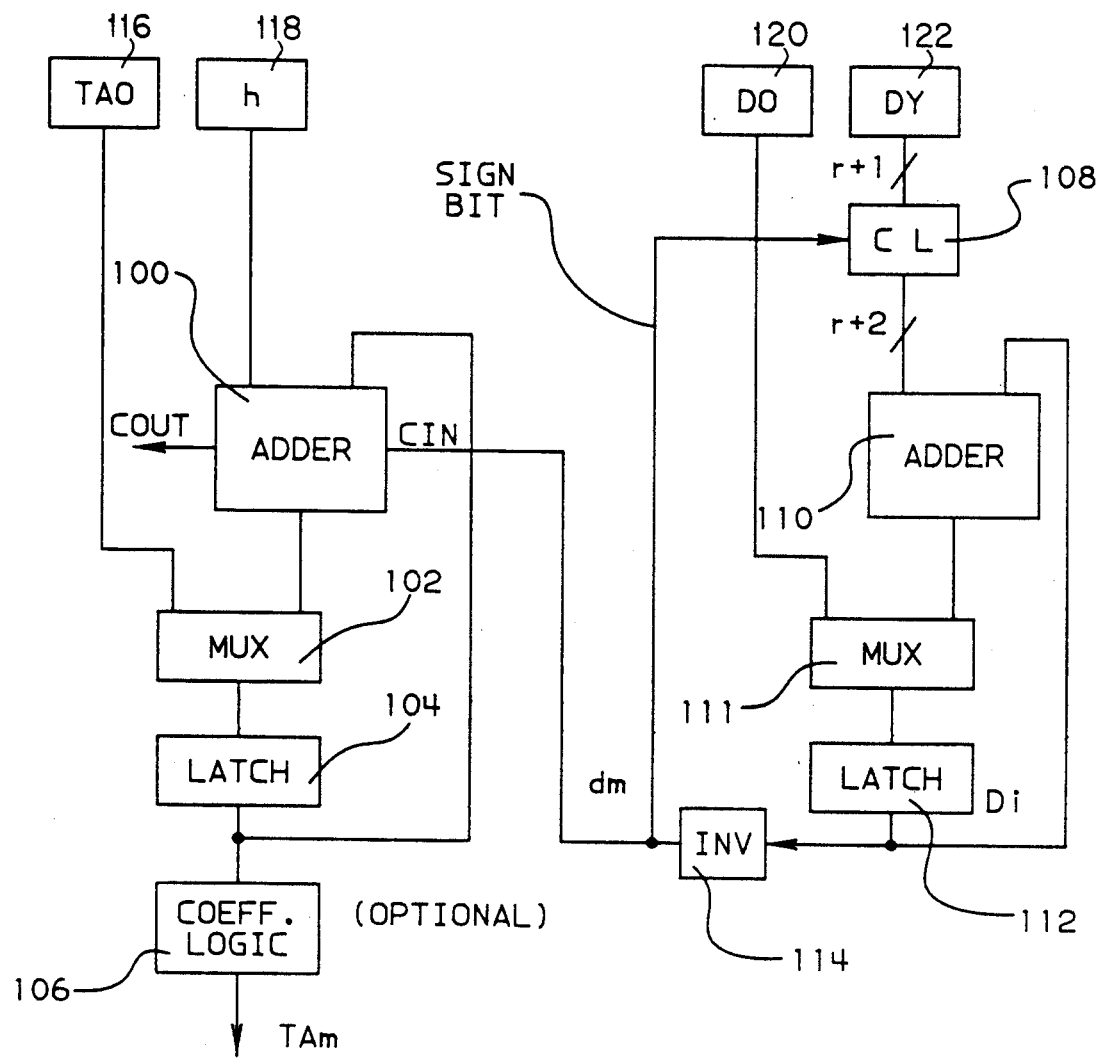
FIG. 11 is a block diagram of a coefficient generator according to the present invention.

One coefficient generator, as shown in FIG. 11, is required for each dimension. The coefficient generator has a coefficient incrementing portion and a coefficient correction portion. T is assumed to be a power of two, for example T=256. The system control processor 12 provides the parameters T*A0 the initial value of the interpolation coefficient, h, the integer interpolation increment, D0 the initial accumulated error, and DY the error correction term, that apply for the whole frame. These parameters are stored in corresponding registers 116, 118, 120 and 122 shown in FIG. 11. Component 108 represents a combinatorial logic that provides a hard-wired left shift by one position, and EXORs the most significant bit with the output from INV 114 (inverter). The CL 108 provides the parameters 2DY or 2DY-2DX to the adder 110 according to the sign of the accumulator term (LATCH) 112. The accumulator is initialized with D0 at the beginning of each row or column. Note that as DX=2**r, the term 2DY-2DX is equal to 2DY with the most significant bit changed. The EXOR function CL108 is used for this purpose. Adder 110 accumulates the coefficient error term, $d_i$, according to Bresenham's algorithm, namely, by adding 2DY to the previous accumulated error term $d_{i-1}$, if $d_{i-1}$ is less than zero and, adding 2DY-2DX from $d_{i-1}$, if $d_{i-1}$ is greater than or equal to zero. Note that 2DY-2DX is always negative thereby reducing the error term, $d_i$. Logic elements 108, 110, 111, 112, and 114 comprises a coefficient correction circuit implementing a Bresenham algorithm as discussed above. The coefficient incrementing circuit comprises logic elements 100, 102, 104, and 106. The initial address TA0 is loaded in the address accumu 104 at the beginning of each row or column. The parameter h is added to the accumulator in every cycle by adder 100. The adder carry-in input is fed with $d_m$ from the accumulator 112. "Coefficient Logic" 106 is responsible for converting from the generated address to the actual coefficient value. It is not required for bi-linear interpolation if T is a power of two. The adder 100 count (carry-out) signal is used to determine when a new input sample is required with the carry-out of the x coefficient generator appearing on line 67 in FIG. 7 and the carry-out of the y coefficient generator appearing on line 68.

Figure 12:
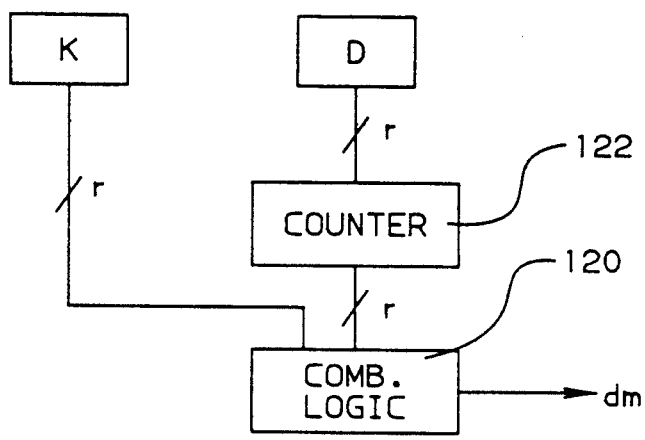
FIG. 12 illustrates an alternative method of generating error term $d_m$ used in an alternate embodiment of the present invention.

FIG. 12 depicts an alternative way to generate the sequence $d_m$ which is practical for small values of r. The r least-significant bits of K and a parameter related to the initial value of $d_m$ are stored in registers K and D respectively. The counter is initialized with D at the beginning of a row or column, and it is incremented as output samples are generated. The output $d_m$ is obtained as a function of K and the counter value using combinatorial logic 120.

Assuming a 1024×1024 output image and that the interpolator is operating 75% of the time, a pixel must be computed every 75 nanoseconds, which is feasible using commercially available components to construct a circuit according to the preferred embodiment. The remaining 25% of the time is reserved for possible bus contention of data coming from the image store, memory refresh, interpolator set up by the system control microprocessor or other functions.

While the present invention has been particularly described and shown with reference to the preferred embodiment, it will be understood by those skilled in the art that the foregoing and other changes in form, dimension, and in the detail may be made herein without departing from the spirit and scope of the invention.

I claim:

1. An interpolator for an image display system comprising:
   first means for storing an image to be interpolated, said image comprising a plurality of picture elements organized in two dimensions;
   second means for transferring said image into a plurality of line buffers such that each line buffer contains one pixel from said image for each pixel position in a first dimension and consecutive line buffers contain pixels across a second dimension;
   coefficient incrementing means for generating interpolation coefficients for interpolation;
   coefficient error correction means for accumulating an error term and for correcting the generated coefficient in response to the sign of said accumulated error term;
   filter means for generating interpolated image values based on the contents of said line buffers and in response to said coefficient incrementing means;
   selection means for consecutively connecting two of said plurality of line buffers to said filter means; and
   frame buffer means for storing the output of said filter means.

2. A system of claim 1 wherein said coefficient incrementing means and error correction means comprise
   a plurality of register means for storing values of an initial accumulated error term, an error correction term, an integer interpolation increment, and an initial interpolation coefficient;
   logic means for determining the accumulated error term associated with an interpolation coefficient;
   logic means for determining a new interpolation coefficient based on said initial interpolation coefficient and said integer interpolation increment incremented by unity, if said accumulated error term is greater than or equal to zero;
   logic means for reducing said accumulated error term if said accumulated error is greater than or equal to zero.

3. The system of claim 1 wherein said interpolation coefficients comprise:
   a first interpolation coefficient for interpolating in a first dimension;
   and a second interpolation coefficient for interpolating in a second dimension;
   and wherein said filter means comprises:
   a plurality of second filter means for interpolating between two pixels from one of said line buffers in response to one of said interpolation coefficients.

4. The system of claim 3, wherein said plurality of second filter means each have an input means and wherein said plurality of second filter means are connected such that said input means of a first of said second filter means is connected to a first line buffer for interpolating in a first dimension;
   said input means of a second of said second filter means is connected to a second line buffer for interpolating in said first dimension; and
   said input means of a third of said second filter means is connected to the output of said first and second of said second filter means for interpolating in a second direction.

5. The system of claim 4, wherein each of said plurality of second filter means comprises:
   difference means for determining the difference between the values of a first and a second pixel from said input means
   multiplication means for determining the product of said difference and said interpolation coefficient; and
   addition means for adding said product and the value of said second pixel.

6. An image display system comprising:
   communication means for communicating with a remote data processing system;
   image storage means for storing an image comprises of a plurality of picture elements organized in two dimensions;
   processor means for controlling said communication means and for storing an image into said image storage means;

data entry means for entering an interpolation command and a magnification factor;

coefficient incrementing means for generating interpolation coefficients based on said interpolation command and said magnification factors;

coefficient error correction means for accumulating an error term and for correcting the generated coefficient in response to the sign of said accumulated error term;

interpolation means for interpolating said image stored in said image storage means in response to said interpolation command and said interpolation coefficients.

7. The system of claim 6, wherein said interpolation means comprises:

access means for accessing said image in said image storage;

a plurality of buffer means for storing in each buffer means one or more pixels from each position in a first dimension each buffer means representing adjacent pixel positions in a second dimension orthogonal to said first dimension;

filter means for interpolating output pixels in response to said interpolation coefficients; and selection means for successively connecting two of said plurality of buffer means to said filter means.

8. The system of claim 7 wherein said interpolation coefficients comprise:

a first interpolation coefficient for interpolating in a first dimension;

and a second interpolating coefficient for interpolating in a second dimension;

and wherein said filter means comprises:

a plurality of second filter means for interpolating between two pixels in response to one of said interpolation coefficients; and wherein said plurality of second filter means are connected such that a first of said second filter means is connected to a first line buffer for interpolating in said first dimension;

a second of said second filter means is connected to a second line buffer for interpolating in said first dimension; and a third of said second filter means is connected to the output of said first and second of said second filter means for interpolating in said second direction.

9. The system of claim 8, wherein each of said plurality of second filter means comprises:

difference means for determining the difference between the values of a first and a second pixel in said line buffer or said output of said first and second of said second filter means;

multiplication means for determining the product of said difference and said interpolation coefficient; and addition means for adding said product and the value of said second pixel.

10. A system of claim 6 wherein said coefficient incrementing means and error correction means comprise:

a plurality of register means for storing values of an initial interpolation increment, and an initial interpolation coefficient;

logic means for determining the accumulated error term associated with an interpolation coefficient;

logic means for determining a new interpolation coefficient based on said initial interpolation coefficient and said integer interpolation increment incremented by unity, if said accumulated error term is greater than or equal to zero;

logic means for reducing said accumulated error if said accumulated error term is greater than or equal to zero.

* * * * *